United States Patent
Hersh et al.

(10) Patent No.: US 6,763,447 B2
(45) Date of Patent: Jul. 13, 2004

(54) LOCK-FREE LIST FOR USE WITH COMPUTER SYSTEM UTILIZING FIFO QUEUE FOR TRACKING ORDER OF VARIOUS SUBLISTS

(75) Inventors: Clifford L. Hersh, Berkeley, CA (US); Herbert W. Sullivan, deceased, late of New York, NY (US), by Joan Todd, legal representative

(73) Assignee: ANTs Software, Inc., Burlingame, CA (US)

( * ) Notice: Subject to any disclaimer, the term of this patent is extended or adjusted under 35 U.S.C. 154(b) by 471 days.

(21) Appl. No.: 09/729,738

(22) Filed: Dec. 4, 2000

(65) Prior Publication Data

US 2002/0059165 A1 May 16, 2002

Related U.S. Application Data

(60) Provisional application No. 60/168,861, filed on Dec. 2, 1999.
(51) Int. Cl.[7] ............................. G06F 7/00; G06F 12/00
(52) U.S. Cl. ........................ 711/218; 711/200; 707/100
(58) Field of Search .............................. 711/100, 200, 711/218; 712/1, 8; 707/100, 101

(56) References Cited

U.S. PATENT DOCUMENTS

| | | | | |
|---|---|---|---|---|
| 4,445,176 A | * | 4/1984 | Burk et al. ................. | 709/231 |
| 4,759,014 A | * | 7/1988 | Decker et al. .............. | 370/503 |
| 6,078,565 A | * | 6/2000 | Ben-Michael et al. ...... | 370/236 |

* cited by examiner

*Primary Examiner*—Tuan V. Thai
(74) *Attorney, Agent, or Firm*—Carr & Ferrell LLP

(57) ABSTRACT

A lock-free list for use with a computer system. The lock-free list includes a list storage structure comprising at least two sublists, each of a plurality of list elements being sequentially assignable to one of the at least two sublists in such manner that a plurality of assigned list elements is partitionable across the at least two sublists, an indicator for indicating whether each of the at least two sublists is empty or in use, an indicator for indicating whether a list element is being removed from each of the at least two sublists, an indicator for recording an order of the at least two sublists into which the plurality of assigned list elements are assigned, and an indicator for recording for each of the at least two sublists, a write address location and a read address location.

27 Claims, 6 Drawing Sheets

LOCK-FREE LIST FOR USE WITH COMPUTER SYSTEM UTILIZING FIFO QUEUE FOR TRACKING ORDER OF VARIOUS SUBLISTS

CROSS REFERENCE TO RELATED APPLICATIONS

The present application claims priority from U.S. Provisional Patent Application Ser. No. 60/168,861, filed on Dec. 2, 1999 by Herbert W. Sullivan and Clifford L. Hersh, the specification of which is hereby incorporated by reference.

BACKGROUND OF THE INVENTION

Brief Description of the Prior Art

A list is a collection of elements, such as data elements, that are accessed in an explicitly ordered sequential fashion. Common list access operations include the write operation, which receives and stores an element onto the list, and the read operation, which removes and forwards an element from the list. In an environment characterized by multiple thread asynchronous operations, previous list implementations have required that the list be locked for the duration of writing or reading an element. Such operations take an interval of time to complete, and often comprise more than one sequential step. Furthermore, with multiple asynchronous list operations taking place, a new operation may arrive while the sequential steps of a previous operation are in progress. Since the steps of different asynchronous operations are not synchronized, such lists have previously been locked from access by other operations during a list operation to prevent list damage or errors.

In contrast to the conventional approach of locking the list as described above, the lock-free list (LFL) described herein does not need to be locked during multiple asynchronous operations. The invention also may be applied to lock-free queues and lock-free linked lists.

The LFL is a collection of sublists, plus various control means and variables, that inherently protect the list during multiple asynchronous operations without requiring list locking, while provide the same functionality as a single list.

SUMMARY OF THE INVENTION

A lock-free list for use with a computer system is provided. The lock-free list comprises a list storage structure comprising at least two sublists, each of a plurality of list elements being sequentially assignable to one of the at least two sublists in such manner that a plurality of assigned list elements is partitionable across the at least two sublists. A plurality of indicators include; an indicator for indicating whether each of the at least two sublists is empty or in use is provided, an indicator for indicating whether a list element is being removed from each of the at least two sublists, an indicator for recording an order of the at least two sublists into which the plurality of assigned list elements are assigned, and an indicator for recording for each of the at least two sublists, a write address location and a read address location.

In order to operate successfully in the environment characterized by multiple thread asynchronous operations involving the list, the invention allows two or more list accesses, including read or write operations, to occur in a time interval of not less than T time units of each other, including the possibility of simultaneous list accesses, such that errors or list corruption do not occur as a result of the time proximity of the list accesses.

DETAILED DESCRIPTION OF THE PREFERRED EMBODIMENT

Figure 1:
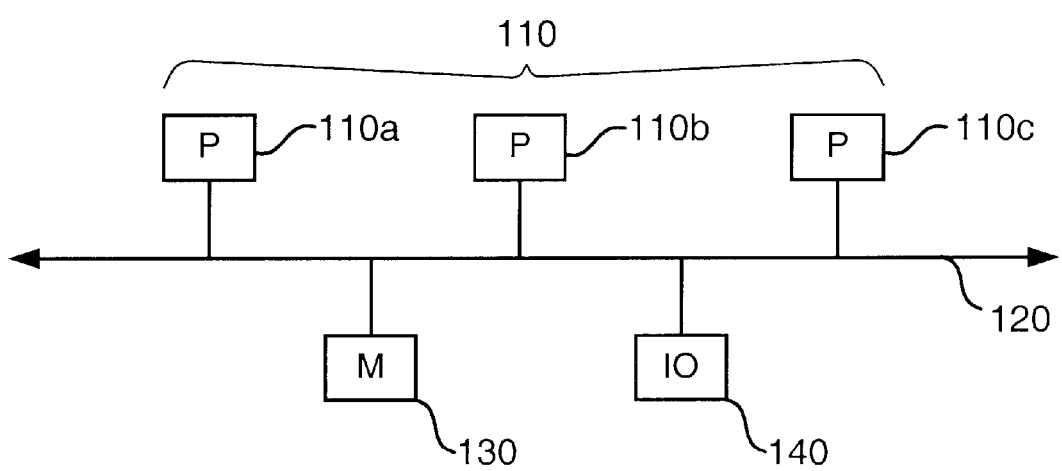
FIG. 1 is a block diagram illustration of a multiprocessor computer system that may be used to host the lock-free list.

FIG. 1 is a block diagram illustration off a computer system that may be used to host the LFL. The computer system comprises one or more processors 110, at least one bus 120, at least one memory 130 and at least one input-output subsystem 140. List operations originating in one or more processors 110 access a collection of sublists stored in memory 130. Those familiar with the art will recognize that many different computer architectures and system components may result in an environment in which multiple thread asynchronous list operations occur.

Figure 2:
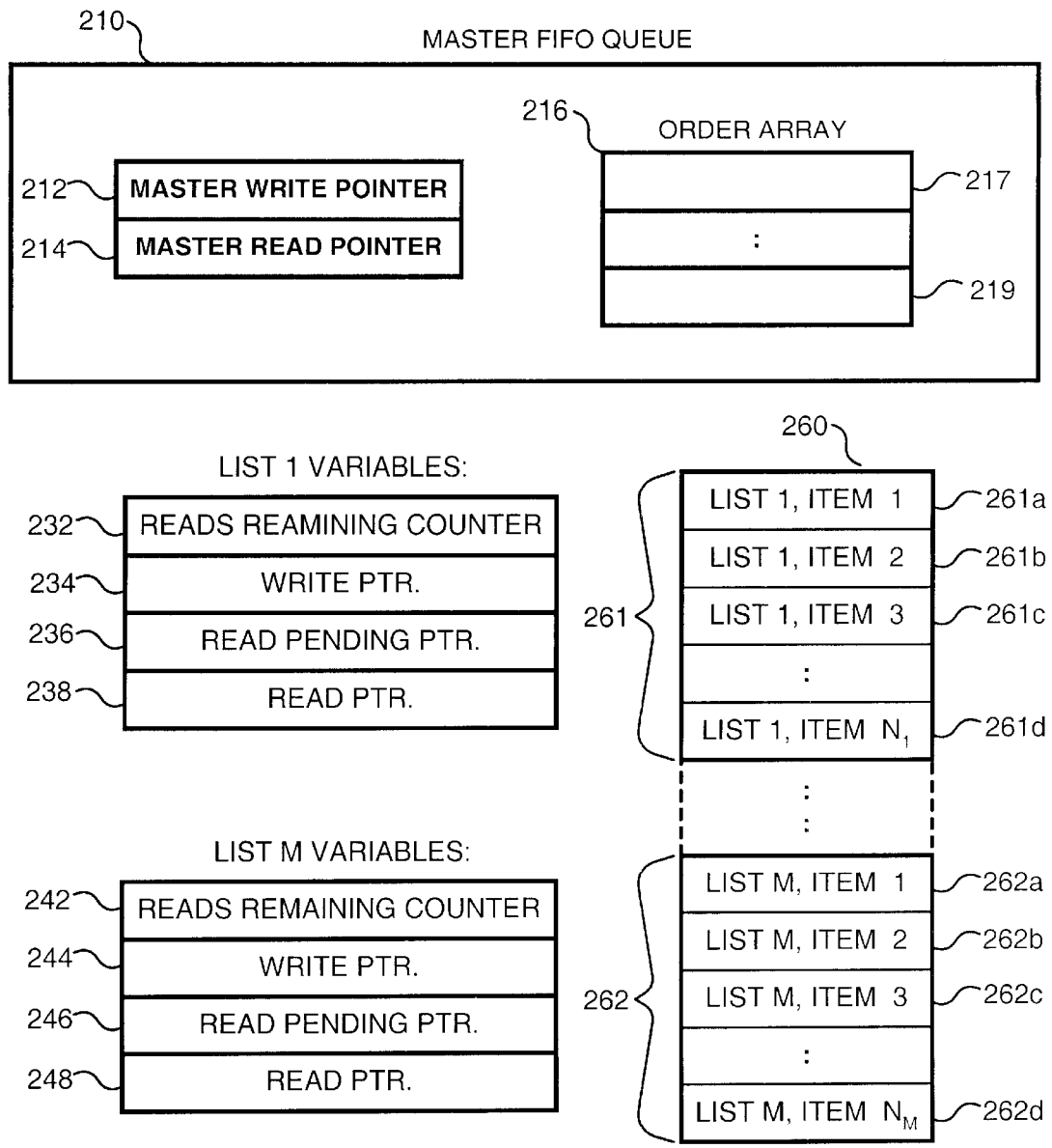
FIG. 2 is a diagram illustration of the variable fields and data structures comprising the lock-free list.

FIG. 2 is a diagram illustration of the data structures and control variables comprising the LFL. Memory 130 contains a portion of memory 260 that is divided into at least two sublists 261 and 262. The sublists 261 and 262 each comprise a series of sequential positions for storing elements. The elements may be any instructions or data, such as variables, arrays, fields, or data structures, that are commonly stored in memory. The element positions of each sublist are accessed in sequential order. Sublists 261 and 262 are filled on an alternating basis, in which each sublist sequentially stores elements from write operations until that sublist is filled. If more than two sublists are used and an empty sublist is needed, a control means selects which empty sublist receives elements from write operations.

A sublist cycle starts with selecting an empty sublist in memory portion 260. Write operations, including multiple thread asynchronous operations, issued by the processors 110 cause elements to be written onto the selected sublist in sequential order. Asynchronous read operations, including multiple thread asynchronous operations, issued by the processors 110 cause elements present on the sublist to be read, and hence removed from the sublist, in sequential order. Elements are written to the sublist until all available positions on the sublist have been occupied during the current sublist cycle. Elements are read from the sublist until all elements placed on the sublist have been read, and consequently removed, leaving the sublist empty.

The complete LFL contents may span two or more sublists, and a means is required for keeping track of the order in which sublists are used in forming the LFL sequential list. The means of using the different sublists in the correct order is provided by a first-in, first out (FIFO) queue 210 consisting of a master write pointer 212, a master read pointer 214 and an order array 216. The order array 216 has an array length equal to the number of sublists in memory portion 260.

The correct sequential order of sublists is maintained in a FIFO queue discipline based on pointers contained in master write pointer 212 and master read pointer 214. The sublist identifier numbers are written into the FIFO queue 210 in the order that the different sublists have received elements. When the LFL has emptied a sublist and a new element read occurs, the sublist identifier number of the next sublist to be read is obtained from the FIFO queue 210, such that the sublists are selected for reading in the same order they were selected for writing.

Each sublist J, such as sublist 261, in memory portion 260 has $N_J$ element positions, so the maximum number of elements that can be written onto or read from that sublist during a sublist cycle is $N_J$. Control variables for the sublists 261 and 262 comprise reads remaining counters 232 and 242, write pointers 234 and 244, read pending pointers 236 and 246, and read pointers 238 and 248.

The write pointers 234 and 244 are used to direct where elements are written within sublists in memory portion 260 by sequentially stepping through the sublist position sequential locations as each write operation occurs. Each sublist in memory portion 260 has a corresponding write pointer, such as write pointer 234 for controlling writes to sublist 261, and write pointer 244 for controlling writes to sublist 262. Elements written onto the sublist remain at the same position until they are read from the LFL.

The write pointers 234 and 244 are incremented each time an element is written onto the corresponding sublist controlled by the pointer, the amount of increment being the number of address units separating the sequential positions. The address is incremented using an uninterruptible instruction so that the address of the written element gets updated before any other operations take place. An uninterruptible exchange and add, such as the XADD instruction on an Intel Pentium microprocessor, is used to increment the write pointer 234 or 244 as a single instruction that cannot be interrupted.

Read instructions from processors 110 are handled by looking up the sublist identification number for read operations issued by the master FIFO queue 210, and then reading and removing appropriate element from that sublist. A sublist may be in either the "empty" state or the "in-use" state. A sublist is "empty" if it contains no valid elements. A sublist is "in-use" if it contains one or more valid elements that have not been read. The memory portion allocated for sublist 261 or 262 consists of element positions that may or may not contain valid data. Consequently, to facilitate element read operations, a particular sublist entry or value is reserved to distinguish element positions that are not part of the current list from those that are part of the current list.

For example, the number zero may be placed within an element position as an indicator that the position is not part of the current list. Conversely, an element position element containing an entry other than zero thus indicates that an element has been written to that position on the active sublist, but has not yet been read. An empty sublist has a zero-containing element at each sublist position. Elements to be read from the sublist are sequentially swapped with zero using an uninterruptible exchange, such as the Pentium microprocessor XCHG instruction.

The reads remaining counters 232 and 242 are used to track whether the sublists are empty or in-use. Reads remaining counters, such as down counters, track the number of elements that have been read from the sublist since the last time the sublist was selected for writing. For example, when a down counter is used, a sublist, such as 261, goes from the empty state to the in-use state, causing the reads remaining counter 232 to be initialized to a starting count $N_J$, the number of sublist positions allocated to that sublist. Accordingly, a down counter having a count of zero indicates that the sublist is empty; otherwise, the sublist is in-use. The number of unread elements remaining on sublist 261 thus is indicated by the contents of reads remaining counter 232.

A sublist, such as sublist 261, when empty, is selected for receiving elements until elements have been written into all sequential positions in that sublist. Elements are written to the sublist starting at the first sublist item position, such as element 261a of FIG. 2, and moving sequentially to the final element position, such as element 261d. When the final position in sublist 261 contains a valid element, the sublist cannot receive additional elements until all valid elements have been read from that sublist. Accordingly, a new empty sublist from memory portion 260, such as sublist 262, is then selected to permit further elements to be stored. Elements remaining on sublist 261 continue to be read in sequential order until sublist 261 is empty, while further sublist additions are collected on sublist 262.

As an example of an element being read, and consequently removed, consider a sublist that is initially empty, such as sublist 261. After an element has been written into sublist position 261a, the first read operation from sublist 261 will read the element written into sublist position 261a and replace the position contents with zero. Suppose the number of elements written onto the sublist is somewhat less than $N_1$, the capacity of sublist 261, and there are several fewer reads than writes. Examining the contents of sublist 261 in sequential position order from lowest sublist position 261a to highest sublist position 261d shows first a series of zeros in the positions where valid data has been read, followed by a series of valid entries representing current sublist content, followed by a series of zeros where valid entries have yet to be written in this sublist cycle.

The read operation finds the first position, such as sublist position 261c, on the sublist identified for the next read operation that contains a valid entry, exchanging that valid element with zero using an uninterruptible exchange, and supplying that element for use by the requesting execution entity, such as a thread. The process of scanning the sublist positions sequentially for the first valid entry is time consuming, so finding the first valid element is facilitated by recording the address of the lowest sequential position that contains a valid value using read pointer 238 for sublist 261 and the read pointer 24 for sublist 262. After the sublist item is read, the corresponding read pointer, 238 or 248, is incremented so that the pointer contains the sequential position of the next unread element. The read pointer allows the search to start as far along the sublist as possible without missing anything not yet read. The use of both the zero indications and the read pointer provide redundancy to ensure that the Correct read element is always used.

The LFL may be used as a linked list or a queue, such as a first-in, first out (FIFO) queue. One intended application of the lock-free list is to serve as a queue, but without needing to lock the queue during queue input or output operations. The invention allows normal, unlocked queue operations, such as FIFO operations using an LFL, to be multithreaded. Queue fairness is absolute when there are many producers and consumers, all of which are handled first in, first out.

Figure 3:
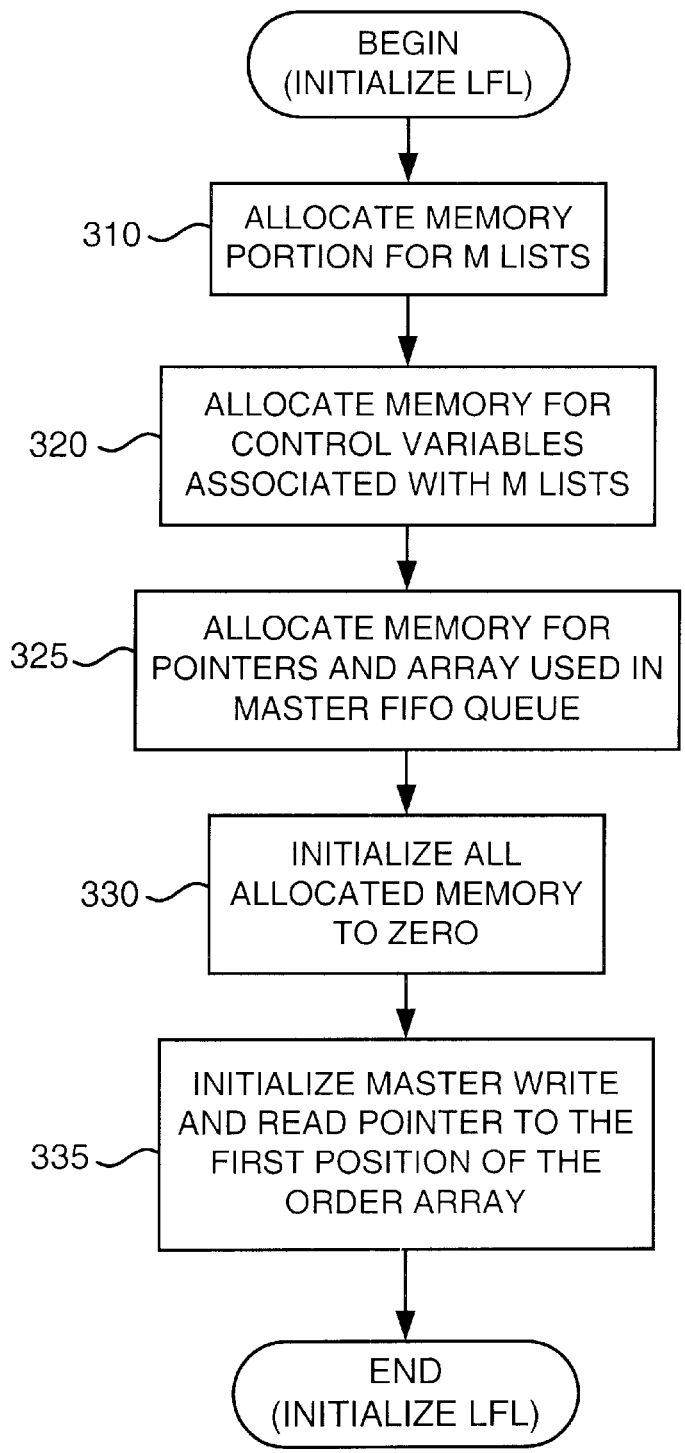
FIG. 3 is a flowchart illustration for initializing the lock-free list.

FIG. 3 is a flow chart illustration of allocating and initializing the sublists, associated variables and data structures. Step 310 allocates memory for sublists 261 and 262 in memory portion 260. Step 320 allocates memory for M sets of pointers and counters associated with the sublists allocated in step 310. Step 325 allocates memory for the pointers 212 and 214 and order array 216 comprising the master FIFO queue 210. Step 330 provides the customary programming precaution of initializing all allocated memory to zero. Step 335 initializes the master read pointer 212 and the master write pointer 214 to the address of the first location 217 in the order array 216.

Figure 4A:
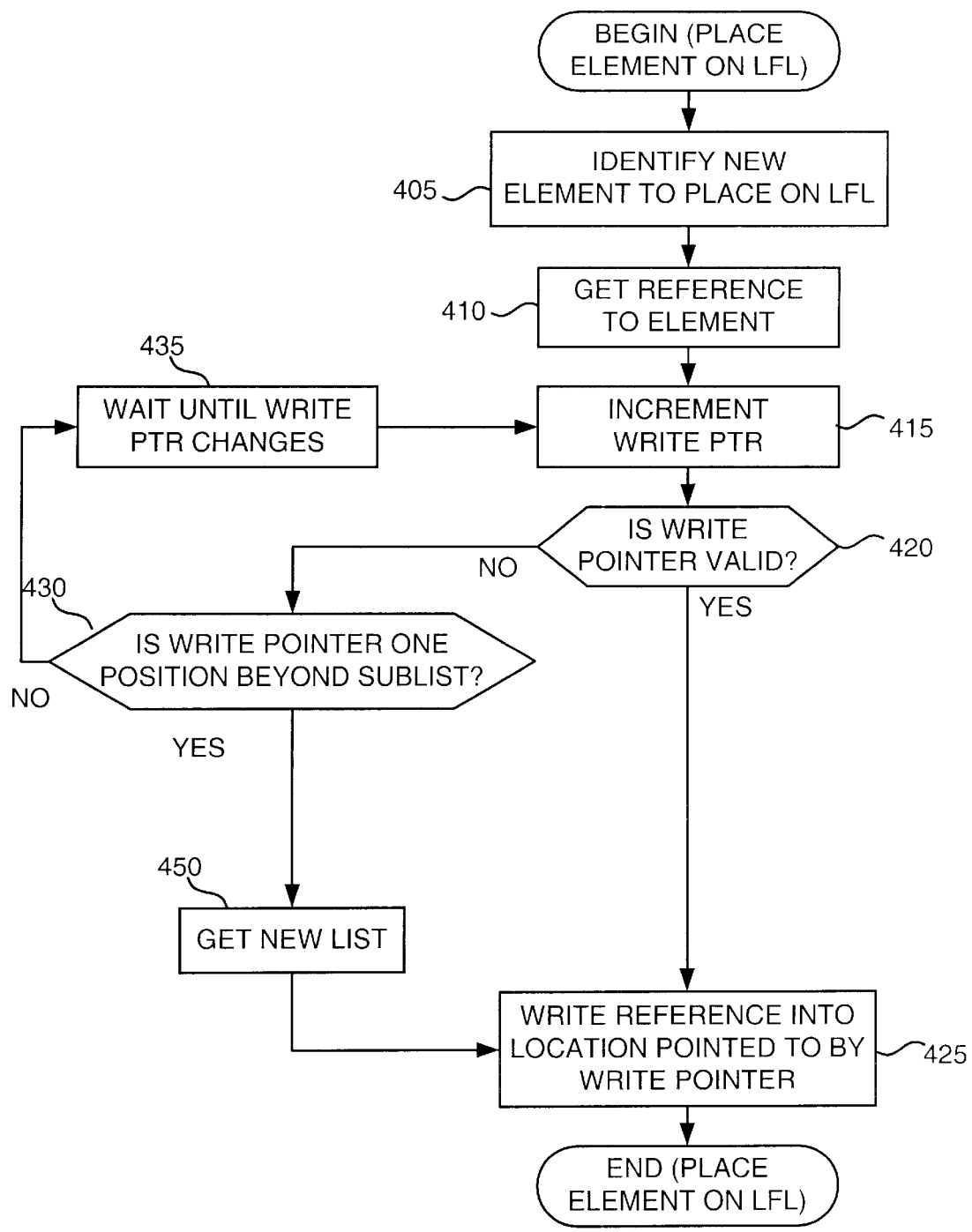
FIG. 4a is a flow chart illustration for writing an element onto the lock-free list.

FIG. 4a is a flow diagram illustration of writing an element onto the LFL. An element is created or identified by a thread of execution in step 405. Step 410 passes the address reference of the element to the lock-free list.

Figure 4B:
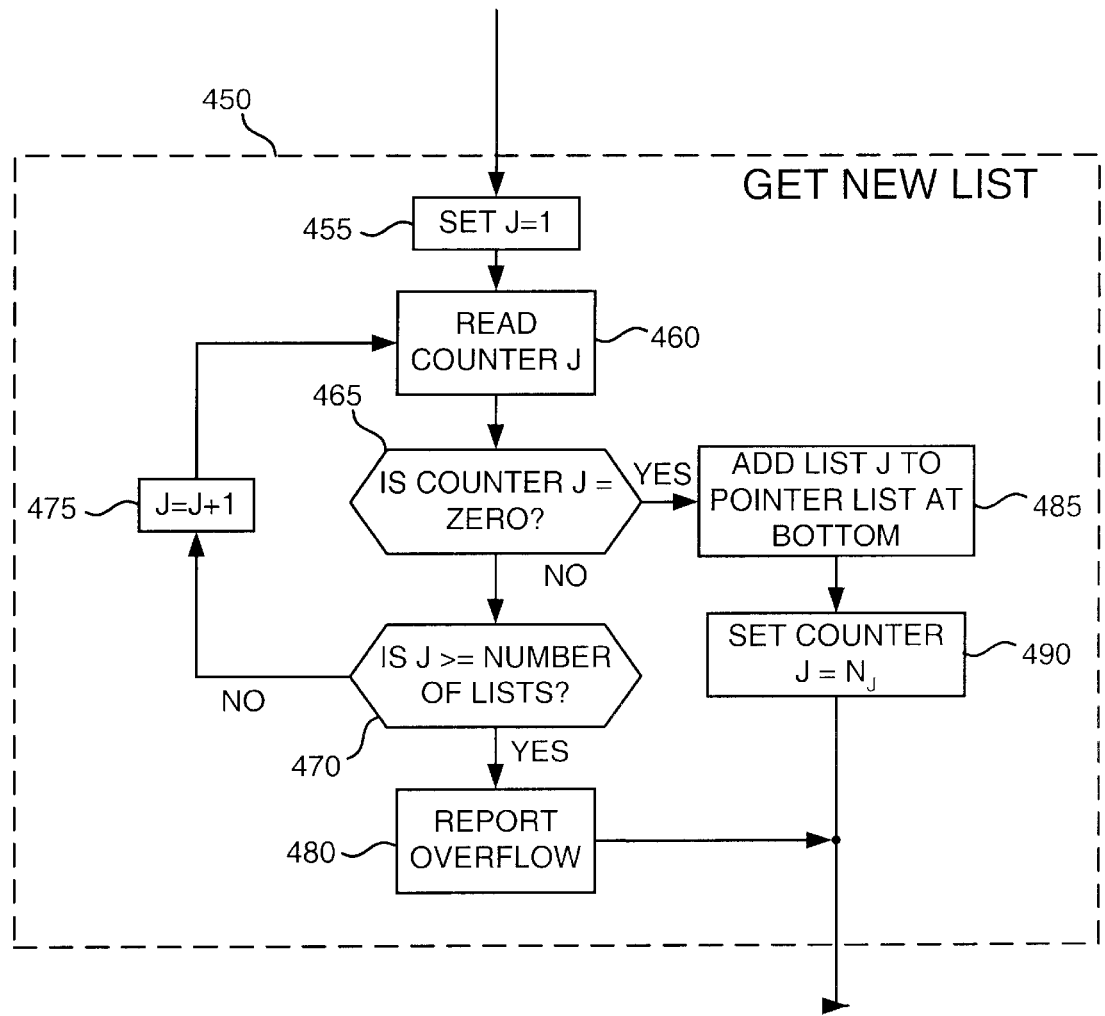
FIG. 4b is a flow chart illustration of steps for selecting a new sublist.

The following uses an example for sublist 261 and write pointer 234, with sublist 261 presently selected for writing, although the discussion applies equally well to any corresponding sublist and write pointer pair, such as sublist 262 and write pointer 244. Step 415 sets write pointer 234 to the next available position on the sublist, such as by incrementing the write pointer. Step 420 tests whether or not the write pointer still points to a position on the present sublist 261, and if so, the procedure goes to step 425; otherwise, the procedure goes to step 430. Step 425 writes the element into a sublist position pointed to by the write pointer 234. Step 430 tests whether the write pointer 234 points to an address exactly one sequential position beyond the last sequential position, such as 261d, of the sublist. If step 430 is true, indicating that the write pointer is one position beyond the address of the last sequential position on the sublist, the procedure goes to step 450, whose detailed steps are illustrated in FIG. 4b. If step 430 is false, this indicates that the write pointer is in transition, and the procedure goes to step 435, which waits for the write pointer to change, and then returns to step 415.

FIG. 4b is an illustration that shows the detailed steps contained in step 450, which obtains a new sublist when the previous sublist used for adding elements becomes full. Step 450 sequentially examines the reads remaining counter variables 232 and 242 until it finds a counter whose value is zero, thus indicating an empty sublist, which then serves as the new sublist. A sublist identification number may be assigned to both a sublist and its corresponding reads remaining counter for computational convenience. For example, reads remaining counter 232 and sublist 261 may correspond with sublist number J=1, and reads remaining counter 242 and sublist 262, may correspond with sublist number J=2. A simple control loop, such as a "FOR" loop, may use sublist identification number J to sequentially examine all of the available sublists until an empty sublist is found. The FOR loop, consisting of steps 455, 460, 465, 470 and 475, searches for an empty sublist starting with sublist identification number J=1. The search terminates when an empty list is found or sublist identification number J has reached the number of sublists in memory portion 260.

Step 455 initializes the sublist identification number to J=1. The contents of the reads remaining counter identified by sublist number J, such as reads remaining counter 232 for sublist 261, are read in step 460, and those contents are tested for a value of zero in step 465. If the reads remaining counter, such as 232, does not contain zero, the sublist corresponding with sublist number J is in use. Test 470 determines whether sublist number J equals or exceeds the number of sublists. Test 470 includes the possibility of sublist number J exceeding the number of sublists as a normal computational precaution that assures that the test will terminate in the event that the FOR loop incrementing process is not computationally exact. If sublist number J equals or exceeds the number of sublists, this indicates that all of the sublists in memory portion 260 are presently in use, so the procedure reports in step 480 that no additional elements may be written onto the LFL due to sublist overflow, and the procedure ends. If the sublist number J is less than the number of sublists, step 475 increments J by 1 and returns to step 460, where the FOR loop is repeated for said incremented value of J. If the contents of the reads remaining counter corresponding to sublist identification number J that was tested in step 465 is zero, the sublist corresponding to sublist identification number J is empty, and thus available, and procedure goes to step 485. Step 485 places the sublist identification number J onto the master FIFO queue 210. Step 490 sets the reads remaining counter corresponding with sublist number J equal to the total number of positions $N_J$ on that sublist. After steps 480 or 490, the procedure continues with step 425 of FIG. 4a.

Figure 5:
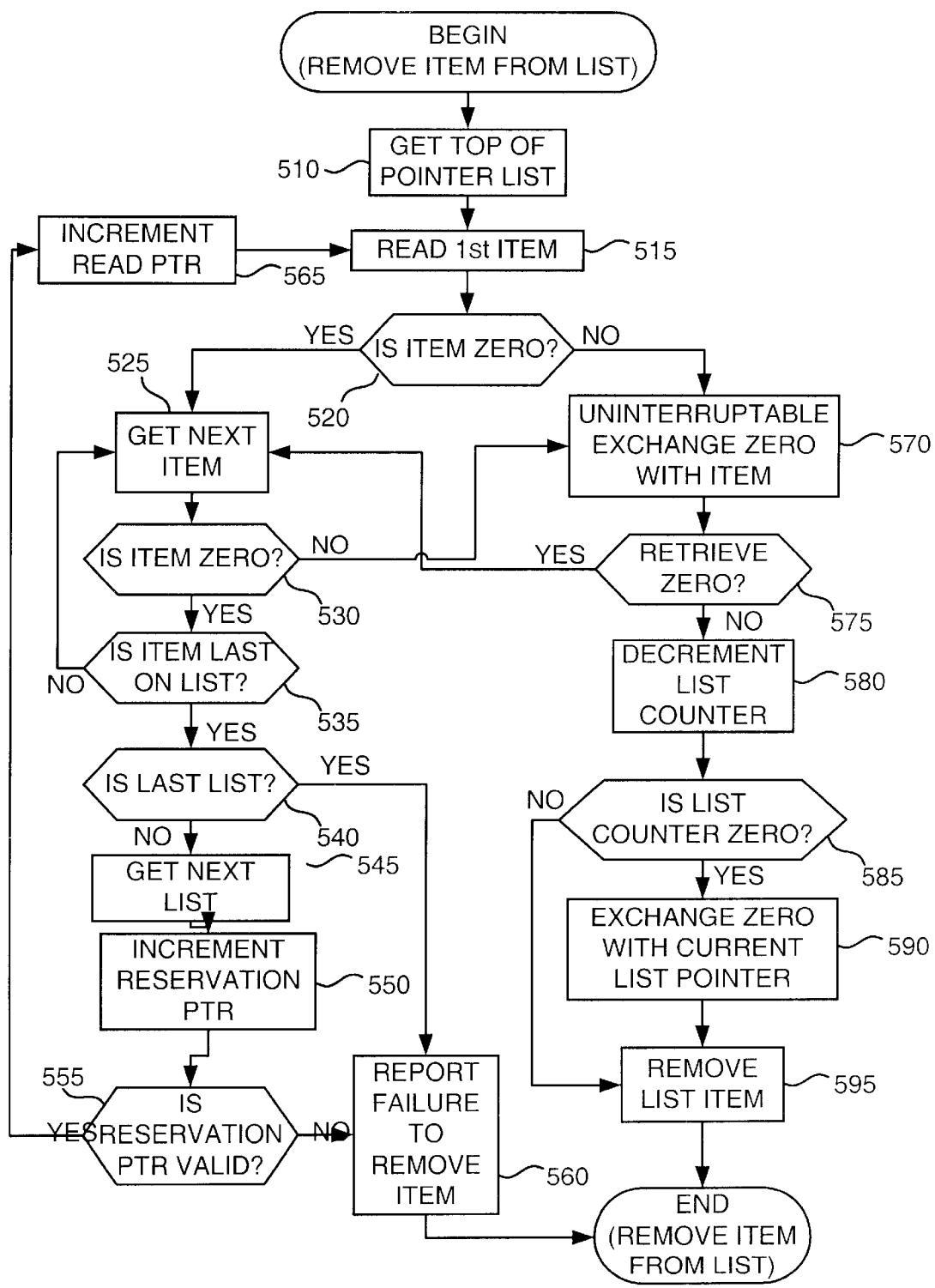
FIG. 5 is a flow chart illustration of reading an element from the lock-free list.

FIG. 5 is an illustration of the flow diagram for removing an item from the LFL. The following uses an example for sublist 261, read pending pointer 236, read pointer 238, and write pointer 234, with sublist 261 presently selected for reading, although the discussion applies equally well to any set of corresponding sublists and pointers, such as sublist 262, read pending pointer 246, read pointer 248, and write pointer 244. Step 505 obtains sublist 261, by reference to the most recently-issued sublist identification number issued by the master FIFO queue, as the sublist currently used for read operations. Step 510 obtains the read pending pointer 236. The read pending pointer should not be greater than the current write pointer unless some malfunction has occurred. Step 515 tests whether the read pending pointer 236 is greater than the write pointer, and goes to step 520, where the read operation is reported as a failure and terminates this read operation; otherwise, the procedure goes to step 525. Step 525 increments the read pending pointer 236 with a non-interruptible increment instruction. Step 530 then performs the same test as in step 515, except that the test now determines whether the now incremented read pending pointer now is greater than the write pointer. If step 530 determines that the read reservation pointer is greater than the write pointer, a malfunction has occurred, and the read pending pointer increment of step 525 is reversed with a decrement in step 535; otherwise, the procedure goes to step 545. Step 535 decrements the read pending pointer using a non-interruptible instruction, and step 540 reports that this read operation has failed, and the procedure terminates for this read operation.

Step 545 tests whether the read pending pointer 236 is greater than the last address on sublist 261, thus indicating that there are no more reads possible on the present list, and the procedure goes to step 550; otherwise the procedure goes to step 565. Step 550 tests whether the read reservation pointer 236 points to one position beyond the present list, and if so, the procedure goes to step 555; otherwise, the procedure goes to step 560. If the reads pending pointer 236 points to one element position beyond the last address in sublist 261, step 555 gets the next read sublist identification number from master FIFO queue 210; otherwise, step 560 waits until operations in progress make a new sublist available. Both steps 555 and 560 return to step 510, where the read pending pointer for the next list is examined.

Step 565 waits to let an in-progress read operation proceed until a valid element is produced. Step 580 reads and removes the element from the LFL using a noninterruptible exchange. Step 590 decrements the reads remaining counter 232. Step 595 returns the element to the requesting thread in the processors 110.

Several embodiments are specifically illustrated and/or described herein. However, it will be appreciated that modifications and variations are covered by the above teachings and within the scope of the appended claims without departing from the spirit and intended scope thereof.

What is claimed is:

1. A lock free list comprising:
   at least two sublists, each sublist comprising a plurality of locations to which each of a plurality of list elements is written and from which each of the plurality of list elements is read, each of the plurality of list elements being written to sequential locations of each of the at least two sublists in such manner that locations of a subsequent sublist are written to when all of the locations of a prior sublist have been written to;
   a first means for tracking an order of the prior and the subsequent sublists;
   a second means for tracking a sublist location into which list elements are written, said second means being changed using an uninterruptible instruction; and
   a third means for tracking a sublist location from which list elements are read, list elements being read using an uninterruptible exchange instruction.

2. The lock free list of claim 1 wherein the first means for tracking further comprises a FIFO queue.

3. The lock free list of claim 2 wherein the FIFO queue further comprises a master write pointer, a master read pointer and an array.

4. The lock free list of claim 1 wherein the second means for tracking further comprises a write pointer into each of the at least two sublists.

5. The lock free list of claim 4 wherein the write pointer is incremented using an XADD instruction.

6. The lock free list of claim 1 wherein the third means for tracking further comprises a read pointer into each of the at least two sublists.

7. The lock free list of claim 6 wherein the read pointer is incremented using an XADD instruction.

8. The lock free list of claim 6 wherein the elements are read using an XCHG instruction.

9. The lock free list of claim 1 wherein the third means for tracking further comprises exchanging an invalid value into each sublist location from which list elements are read using an XCHG instruction.

10. A lock free list comprising:
    at least two linked sublists, each of a plurality of list elements being written to sequential locations of each of the at least two sublists in such manner that locations of a subsequent sublist are written to when all of the locations of a prior sublist have been written to;
    a FIFO queue for tracking an order of the prior and the subsequent sublists;
    a write pointer for tracking a sublist location into which list elements are written, the write pointer being changed using an uninterruptible instruction; and
    a read pointer for tracking a sublist location from which list elements are read, list elements being read using an uninterruptible exchange instruction.

11. The lock free list of claim 10 wherein the FIFO queue further comprises a master write pointer, a master read pointer and an array.

12. The lock free list of claim 10 wherein the write pointer is incremented using an XADD instruction.

13. The lock free list of claim 10 wherein the read pointer is incremented using an XADD instruction.

14. The lock free list of claim 10 wherein the elements are read using an XCHG instruction.

15. A lock free list for use in a computer system comprising:
    a memory comprising at least two sublists, each sublist comprising a plurality of memory locations to which each of a plurality of list elements is written and from which each of the plurality of list elements is read, each of the plurality of list elements being written to sequential memory locations of each of the at least two sublists in such manner that memory locations of a subsequent sublist are written to when all of the memory locations of a prior sublist have been written to;
    a first means for tracking an order of the prior and the subsequent sublists;
    a second means for tracking a sublist memory location into which list elements are written, the second means for tracking being changed using an uninterruptible instruction; and
    a third means for tracking a sublist memory location from which list elements are read, list elements being read using an uninterruptible exchange instruction.

16. A computer readable medium containing computer readable program code comprising:
    a code segment for generating at least two sublists, each sublist comprising a plurality of locations to which each of a plurality of list elements is written and from which each of the plurality of list elements is read, each of the plurality of list elements being written to sequential locations of each of the at least two sublists in such manner that locations of a subsequent sublist are written to when all of the locations of a prior sublist have been written to;
    a code segment for generating a first pointer for tracking an order of the prior and the subsequent sublists;
    a code segment for generating a second pointer for tracking a sublist location into which list elements are written, the second pointer being changed using an uninterruptible instruction; and
    a code segment for generating a third pointer for tracking a sublist location from which list elements are read, the list elements being read using an uninterruptible exchange instruction.

17. A FIFO queue comprising:
    at least two sublists, each sublist comprising a plurality of locations to which each of a plurality of list elements is written and from which each of the plurality of list elements is read, each of the plurality of list elements being written to sequential locations of each of the at least two sublists in such manner that locations of a subsequent sublist are written to when all of the locations of a prior sublist have been written to;
    a first means for tracking an order of the prior and the subsequent sublists;
    a second means for tracking a sublist location into which list elements are written, the second means being changed using an uninterruptible instruction;
    a third means for tracking a sublist location from which elements are read, list elements being read using an uninterruptible exchange instruction.

18. A computer system comprising:
    at least one processor;
    at least one memory;
    at least two sublists, each sublist comprising a plurality of locations within the at least one memory to which each of a plurality of list elements is written to and from which each of the plurality of list elements is read, each of the plurality of list elements being written to sequential locations of each of the at least two sublists in such manner that locations of a subsequent sublist are written to when all of the locations of a prior sublist have been written to;

a FIFO queue under control of the at least one processor for tracking an order of the prior and the subsequent sublists;

a write pointer into each of the at least two sublists for tracking a sublist location into which list elements are written, said write pointer being changed using an uninterruptible instruction under control of the at least one processor, and a read pointer into each of the at least two sublists for tracking a sublist location from which list elements are read, list elements being read using an uninterruptible exchange instruction under control of the at least one processor.

19. A method for generating a lock free list comprising:

providing at least two sublists, each sublist comprising a plurality of locations to which each of a plurality of list elements is written and from which each of the plurality of list element is read, each of the plurality of list elements being written to sequential locations of each of the at least two sublists in such manner that locations of a subsequent sublists are written to when all of the locations of a prior sublist have been written to;

providing a first means for tracking an order of the prior and the subsequent sublists;

providing a second means for tracking a sublist location into which list elements are written, the second means being changed using an uninterruptible instruction; and providing a third means for tracking a sublist location from which list elements are read, list elements being read using an uninterruptible exchange instruction.

20. The method of claim 19 wherein the first means for tracking further comprises a FIFO queue.

21. The method of claim 20 wherein the FIFO queue further comprises a master write pointer, a master read pointer and an array.

22. The method of claim 19 wherein the second means for tracking further comprises a write pointer into each of the at least two sublists.

23. The method of claim 22 wherein the write pointer is incremented using an XADD instruction.

24. The method of claim 19 wherein the third means for tracking further comprises a read pointer into each of the at least two sublists.

25. The method of claim 24 wherein the read pointer is incremented using an XADD instruction.

26. The method of claim 24 wherein the elements are read using an XCHG instruction.

27. The method of claim 19 wherein the third means for tracking further comprises exchanging an invalid value into each sublist location from which list elements are read using an XCHG instruction.

* * * * *